United States Patent Office 3,111,534
Patented Nov. 19, 1963

3,111,534
METHOD OF PREPARING ORGANOSILICON FUNCTIONAL COMPOUNDS AND PRODUCTS THEREOF
Leo H. Sommer, State College, Pa., assignor to Dow Corning Corporation, Midland, Mich., a corporation of Michigan
No Drawing. Filed Nov. 15, 1954, Ser. No. 469,042
5 Claims. (Cl. 260—448.2)

This invention relates to a method of preparing silanes and siloxanes having functional organic groups as a part of the molecule and to the compounds so prepared.

Many functional organosilicon compounds, i.e., compounds having functional organic groups such as hydroxyl, carboxyl, etc., as a part of the molecule have been prepared. In general, one of the difficulties in the preparation of these compounds has been the fact that it was necessary to prepare many of them beginning with trimethylchloromethylsilane which was reacted with a functional organic compound and thereafter treated with sulfuric acid to cleave one of the methyl groups and generate a siloxane. This method of synthesis is expensive inasmuch as it involves a round about procedure and also involves the use of a rare and rather expensive starting material. Prior attempts to react various organofunctional compounds directly with a chloromethyl group on a silicon having an oxygen attached thereto have resulted in extensive cleavage of the chloromethyl group. Thus directed large scale synthesis of functional siloxanes from chloromethyl containing siloxane or from chloromethyl containing alkoxides has been precluded.

It is the object of the present invention to provide a novel method for preparing functional organic silanes an siloxanes directly from chloromethyl containing silanes and siloxanes. Another object is to provide novel organofunctional siloxanes which are useful as lubricants, additives for dimethylsiloxane fluids, corrosion inhibitors and intermediates in the preparation of organosilicon-organic resin copolymers.

In accordance with this invention an organosilicon compound of the formula

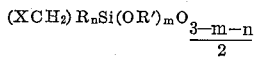

in which X is a halogen atom having an atomic weight above 20, R and R' are monovalent hydrocarbon radicals or halogenated aryl hydrocarbon radicals, $n$ has a value from 0 to 2 and $m$ has a value from 0 to 3, is reacted with the alkali metal derivative of a compound of the formula $Y_2CH_2$ in which Y is a radical selected from the group —C≡N, —COR″, —COOR″, and phenyl in which R″ is a monovalent hydrocarbon radical, in the presence of a solvent which is free of active hydrogen.

The organosilicon compounds employed in this invention can be either polymers or monomers. In addition they can be either homopolymers or copolymers. The homopolymers are siloxanes having 1 halomethyl group attached to each silicon atom and at least 1 oxygen atom or OR' group attached to each silicon atom, any remaining valences of the silicon being satisfied by monovalent hydrocarbon radicals, halogenated aryl hydrocarbon radicals or hydrocarbonoxy radicals of the type OR' where R' is any monovalent hydrocarbon or any halogenated aryl hydrocarbon radical. Specific examples of such homopolymers which are operative herein are chloromethylphenylsiloxane, bromomethylallylsiloxane, tetramethyl bis-chloromethyldisiloxane, bis-chloromethyldimethyldiethoxydisiloxane, iodomethyloctadecylsiloxane, chloromethylcyclohexylsiloxane and chloromethylsiloxane.

The halomethyl groups on the silicon are best prepared by direct halogenation of the corresponding methyl siloxane. Where the halogen is iodine the compounds are best prepared by an interchange reaction between the corresponding chloromethylsiloxane and sodium iodine. In those cases where R is an aliphatic hydrocarbon radical other than methyl, the compounds are best prepared by Grignardizing the corresponding halomethyltrihalosilanes, for example chloromethyltrichlorosilane, and thereafter hydrolyzing to produce the siloxane.

Copolymers which are operative in this invention are those which contain at least 1 halomethyl group per molecule. The remaining units of the copolymer can be composed of hydrocarbon substituted siloxanes, halogenated aryl hydrocarbon substituted siloxanes, $SiO_2$ units and hydrogen containing siloxane units. Specific examples of copolymers which are operative herein are pentamethylchloromethyldisiloxane, heptamethylchloromethylcyclotetrasiloxane; a copolymer of .1 mol percent chloromethylmethylsiloxane, 89.9 mol percent dimethylsiloxane and 10 mol percent phenylmethylsiloxane; a copolymer of 5 mol percent bromomethylchlorophenylsiloxane, 5 mol percent vinylmethylsiloxane and 90 mol percent phenylmethylsiloxane, copolymers of dimethylsiloxane and chloromethyldimethylsiloxane, copolymers of chloromethylmethylsiloxane, methylhydrogensiloxane and trimethylsiloxane; and copolymers of phenylmethylsiloxane, diphenylsiloxane, monomethylsiloxane and chloromethylsiloxane.

The monomeric organosilicon compounds which are operative hereion are those of the formula

in which X, R, R' and $n$ are as above defined. Specific examples of such compounds are chloromethyldimethylethoxysilane, chloromethyltriethoxysilane, bromomethylphenyldimethoxysilane, iodomethyldimethylphenoxysilane, chloromethylvinylphenylchlorophenoxysilane, and chloromethylcyclohexyldistearyloxysilane.

The organofunctional compounds which are operative in this invention include any compound having 2 of the following groups attached to the same carbon atom in some portion of the molecule. These groups are nitrile, keto, ester and phenyl. Specific examples of operative compounds are malonic nitrile, beta-diketones of the formula R″COCH₂COR″ beta-keto esters of the formula R″COCH₂COOR″, beta-nitrile esters of the formula

beta-nitrile ketones of the formula NCCH₂COR″, beta-phenylketones of the formula PhCH₂COR″, beta-phenyl esters of the formula PhCH₂COOR″, diphenylmethane and benzylnitrile. In all of the above compounds R″ can be any monovalent hydrocarbon radical such as methyl, ethyl, octadecyl, allyl, vinyl, cyclohexyl, cyclohexenyl, phenyl, naphthyl, tolyl, benzyl, and xenyl or any halogenated aryl hydrocarbon radical such as chlorophenyl, chloronaphthyl or chloroxenyl.

The reaction of this invention is carried out with the alkali metal derivatives of these organofunctional compounds. The exact position of the alkali metal atoms is not known but the reaction proceeds as if they were attached to the methylene carbon. The derivative of any alkali metal such as sodium, potassium, lithium and caesium can be employed. The reaction must be carried out in a solvent which is free of active hydrogen. The term "active hydrogen" as employed herein means hydrogen which will react with methyl Grignard to give methane. Thus the solvent must be substantially free of hydrogen atoms attached to oxygen, sulfur, nitrogen or halogen. Any solvent substantially free of active hydrogen can be employed herein. Specific examples of solvents which are operative are hydrocarbons such as toluene, xylene, petroleum naphtha, ethers such as dibutyl ether, diamyl ether, dioxane, dimethyl ether of ethylene glycol, dipropyl ether of diethylene glycol, dimethyl ether of dipropylene glycol and dimethyl ether of tripropylene glycol and gem-ethers such as ethylal and acetal.

The primary reaction in this invention may be represented schematically as follows:

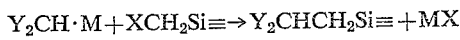

The reaction proceeds best when the mixture of the reactants and solvent is warmed to temperatures from 50 to 150° C. After completion of the reaction the precipitated alkali metal halide is removed and the product recovered by removal of the solvent.

When only one halomethyl group is involved in the reaction with one Y₂CH·M molecule the products of this invention have the formula

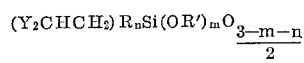

in which Y, R, $n$, R′ and $m$ are as above defined. In those cases where the halomethyl groups are located on adjacent silicon atoms in a siloxane system, two halomethyl groups may react with one Y₂CH·M molecule with the formation of a six-membered ring. For example, sym-bis-halomethyldisiloxanes react to give cyclic compounds of the formula

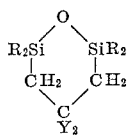

In those cases in which both of the Y's are COOR″ groups the compounds can be hydrolyzed and decarboxylated to give the corresponding monocarboxylic acids of the formula

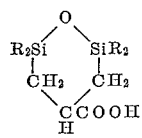

These acids can be esterified in the conventional manner to give compounds of the formula

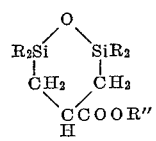

These cyclic compounds can be represented by the generic formula

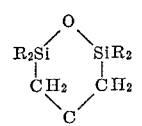

in which A is a radical of the group CN, COR″, COOR″, Ph or hydrogen, no more than one A group attached to any one carbon being hydrogen.

These siloxanes can be copolymerized with monovalent hydrocarbon substituted and halogenated monovalent hydrocarbon substituted siloxanes by means of acid copolymerization. These copolymers can contain

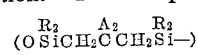

units and

units where Z is hydrocarbon, halogenated hydrocarbon or hydrogen and $a$ has a value from 0 to 3 inclusive.

The compositions prepared by the method of this invention are useful as intermediates in the preparation of organosilicon-organic resin copolymers. For example one may introduce carboxylic acid groups into a siloxane molecule by the method of this invention and thereafter react the carboxylated siloxane with polyhydric alcohols, polyamines or other organic compounds which will condense with carboxylic acids. The resins so formed are useful for protective coating and for electrical insulation.

The following examples are illustrative only and should not be construed as limiting the invention which is properly delineated in the appended claims.

*Example 1*

23 g. of clean sodium metal and 500 ml. of dry toluene were heated until the sodium melted. The mixture was stirred to produce finely divided sodium. 500 ml. of toluene were added and the mixture cooled to 50° C. whereupon 192 g. of diethylmalonate were added over a half-hour period. The mixture was stirred at 50° C. overnight and 400 ml. of additional toluene were added. 207 g. of bis-iodomethyltetramethyldisiloxane was then added over a half-hour period. The mixture was heated to reflux for 48 to 50 hours. The mixture was then cooled and filtered. The toluene was removed by distillation and the residue was distilled to give a 61% yield of the compound

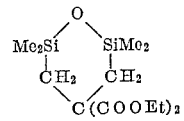

boiling point 134° C. at 7 mm., $n_D^{20}$ 1.4485, $d_4^{20}$ 1.043 and having a MR$_D$ of 81.8.

*Example 2*

110 g. of the cyclic diester of Example 1, 500 ml. of glacial acetic acid and 150 ml. of concentrated HCl were refluxed overnight. Upon cooling white crystals precipitated. These were filtered and the filtrate was evaporated on a steam bath to a volume of about 50 ml. Upon cooling additional crystals precipitated and were removed by filtration. The total amount of product was 70 g. When the crystals were recrystallized from petroleum ether (boiling 67–92° C.) there was obtained shiny white crystals melting 144–145° C. These were the compound

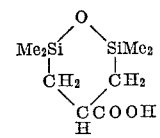

This acid was found to have a neutral equivalent of 217.

*Example 3*

60 g. of the cyclic acid of Example 2, 500 ml. of absolute ethanol and 500 ml. concentrated HCl were refluxed for 18 hours. During the next 10 hours the ethanol and ethanol-water azeotrope were taken off slowly from the reaction mixture. The residue was fractionated at reduced pressure and there was obtained the cyclic monoester of the formula

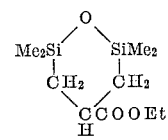

B.P. 112° C. at 16 mm., $n_D^{20}$ 1.4392, MR$_D$ 66.7.

The above cyclic ester was copolymerized with hexamethyldisiloxane by agitating a mixture of 192 g. of the ester, 378 g. of hexamethyldisiloxane and 20 ml. of concentrated H₂SO₄ at room temperature for 24 hours. The resulting mixture was washed with water, dried over potassium carbonate and then fractionated to give the compounds

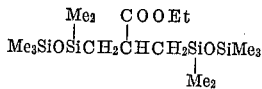

B.P. 121 to 125° C. at 4 mm., $n_D^{20}$ 1.4234 and

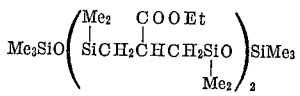

B.P. 207° C. at 8 mm., $n_D^{20}$ 1.4433.

Example 4

10 g. of sodium metal were dispersed in 400 ml. of dry toluene as in the method of Example 1. After cooling, 56.5 g. of ethylcyanoacetate were added over a period of 15 minutes. 110 g. of additional dry toluene were added and the mixture was stirred and heated at 50° C. overnight. 120 g. of pentamethyliodomethyldisiloxane was then added over a period of a half-hour and the mixture was then refluxed for 36 hours. The reaction mixture was cooled, filtered and distilled at reduced pressure to give the compound

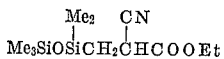

B.P. 137–139° C. at 16 mm. and having an $MR_D$ of 73.1.

Example 5

9.4 g. of sodium metal were reacted in toluene with 53 g. of ethyl acetoacetate and the resulting product was reacted with 115 g. of pentamethyliodomethyldisiloxane in the manner of Example 4. The product was filtered and distilled to give the compound

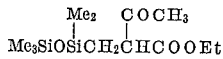

Example 6

8.05 g. of lithium metal were cut into small pieces and refluxed with 290 g. ethylmalonate in ether solution for one hour. 116 g. of bis-chloromethyltetramethyldisiloxane was then added together with 900 ml. of dry toluene. The ether was removed and the mixture refluxed for 68 hours. Upon distillation of the product the compound

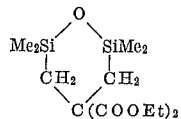

was obtained.

Example 7

.45 mol of sodium and .45 mol of ethylmalonate were mixed in 150 ml. of the diethylether of diethylene glycol and heated to melt the sodium. A clear red solution was obtained. .4 mol of pentamethyliodomethyldisiloxane was added to the cooled solution and the mixture was heated to 100° C. for 15 hours. The mixture was cooled and the sodium iodide was filtered off. The product was distilled to give the compound

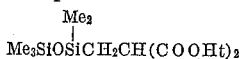

B.P. 130° C. at 9 mm. and having $MR_D$ 1.4240.

Example 8

When one mol of the sodium derivative of

is reacted with one mol chloromethylheptamethylcyclotetrasiloxane in the diethylether of ethyleneglycol in the manner of Example 7, the compound

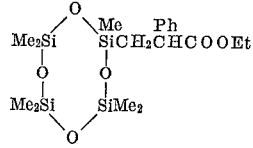

is obtained.

Example 9

When chloromethylchlorophenylallylethoxysilane is reacted with the sodium derivative of ethylmalonate in accordance with the procedure of Example 7, the compound

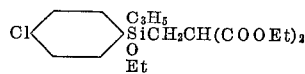

is obtained.

Example 10

When bromomethyldimethylphenoxysilane is reacted with the sodium derivative of acetoacetone in the manner of Example 7, the compound $Me_2(PhO)SiCH_2CH(COMe)_2$ is obtained.

From the above specification and examples it will be seen that the R radicals are preferably alkyl, aryl, alkenyl, cycloaliphatic, or haloaryl radicals; the R' radicals are preferably alkyl, aryl, or haloaryl radicals; the R" radicals are preferably alkyl, aryl, alkenyl, cycloaliphatic, haloaryl, or aralkyl radicals; and the Z radicals are preferably alkyl, aryl, alkenyl, or haloaryl radicals.

That which is claimed is:

1. A method which comprises reacting a compound of the average general formula

in which X is a halogen atom having an atomic weight above 20, R is selected from the group consisting of alkyl, aryl, alkenyl, cycloaliphatic and haloaryl radicals, R' is selected from the group consisting of alkyl, aryl, and haloaryl radicals, n has a value from 0 to 2 inclusive, m has a value from 0 to 3 inclusive, and the sum of m+n has a value of from 0 to 3 inclusive, with an alkali metal derivative of a compound of the formula $Y_2CH_2$ in which Y is a radical selected from the group consisting of CN, COR", COOR", and phenyl, in which R" is a radical selected from the group consisting of alkyl, aryl, alkenyl, cycloaliphatic, haloaryl and aralkyl radicals, in the presence of a solvent which is substantially free of active hydrogen.

2. A copolymeric siloxane in which at least 1 polymer unit per molecule is of the formula

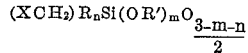

in which Y is a radical of the group consisting of CN, COR", COOR", and phenyl in which R" is selected from the group consisting of alkyl, aryl, alkenyl, cycloaliphatic, haloaryl and aralkyl radicals, R is selected from the group consisting of alkyl, aryl, alkenyl, cycloaliphatic and haloaryl radicals and n has a value from 0 to 2 inclusive, there being not more than one said COOR" group on any one carbon atom, the remaining units in the copolymer being siloxane units of the formula

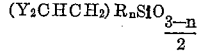

in which Z is selected from the group consisting of alkyl, aryl, alkenyl and haloaryl radicals and hydrogen and $a$ has a value from 0 to 3 inclusive.

3. A cyclic organosilicon compound of the formula

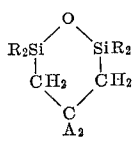

in which R is selected from the group consisting of alkyl, aryl, alkenyl, cycloaliphatic and haloaryl radicals and A is a radical selected from the group consisting of CN, COR'', COOR'', phenyl and hydrogen in which R'' is a radical selected from the group consisting of alkyl, aryl, alkenyl, cycloaliphatic, haloaryl and aralkyl radicals and in which no more than one A group attached to a single carbon is hydrogen the one A group being hydrogen only when the other A group is the radical COOR''.

4. A copolymeric siloxane in which at least one siloxane unit per molecule is of the formula

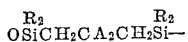

in which R is of the group consisting of alkyl, aryl, alkenyl, cycloaliphatic and haloaryl radicals, and A is a radical selected from the group consisting of CN, COR'', COOR'', phenyl and hydrogen, and in which no more than one A group attached to a single carbon atom is hydrogen, said one A group being hydrogen only when the other A group is COOR'', R'' in the above radicals being selected from the group consisting of alkyl, aryl, alkenyl, cycloaliphatic, haloaryl, and aralkyl radicals the remaining units in the copolymer being siloxane units of the formula

in which Z is selected from the group consisting of alkyl, aryl, alkenyl and haloaryl radicals and hydrogen and $a$ has a value from 0 to 3 inclusive.

5. A method which comprises reacting a compound selected from the group consisting of (1) compounds of the formula

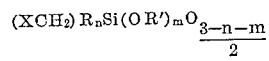

in which X is a halogen atom having an atomic weight above 20, R is selected from the group consisting of alkyl, aryl, alkenyl, cycloaliphatic and haloaryl radicals, R' is selected from the group consisting of alkyl, aryl, and haloaryl radicals, $n$ has a value of from 0 to 2 inclusive, $m$ has a value from 0 to 3 inclusive, and the sum of $m+n$ has a value of from 0 to 3 inclusive, and (2) copolymeric organosiloxanes consisting essentially of units of the aforesaid formula wherein the sum of $m+n$ is less than 3, and of units of the formula

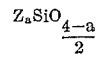

in which Z is selected from the group consisting of alkyl, aryl, alkenyl and haloaryl radicals and hydrogen atoms, and $a$ has a value of from 0 to 3 inclusive, with an alkali metal derivative of a compound of the formula $Y_2CH_2$ in which Y is a radical selected from the group consisting of CN, COR'', COOR'', and phenyl, in which R'' is selected from the group consisting of alkyl, aryl, alkenyl, cycloaliphatic, haloaryl and aralkyl radicals, in the presence of a solvent which is substantially free of active hydrogen.

References Cited in the file of this patent
UNITED STATES PATENTS 2,589,445  Sommer _____ Mar. 18, 1952
2,723,987  Speier _____ Nov. 15, 1955